United States Patent [19]

Greathouse et al.

[11] Patent Number: 4,790,495
[45] Date of Patent: Dec. 13, 1988

[54] CASCADE THRUST REVERSER

[75] Inventors: William K. Greathouse; Sherman F. Martin, both of East Northport, N.Y.

[73] Assignee: Grumman Aerospace Corporation, Bethpage, N.Y.

[21] Appl. No.: 122,556

[22] Filed: Nov. 12, 1987

Related U.S. Application Data

[63] Continuation of Ser. No. 679,140, Dec. 6, 1984, abandoned.

[51] Int. Cl.$^4$ .............................................. F02K 1/60
[52] U.S. Cl. ........................... 244/110 B; 239/265.29; 60/230
[58] Field of Search ...................... 244/110 B; 60/230; 239/265.27, 265.29

[56] References Cited

U.S. PATENT DOCUMENTS

| | | | |
|---|---|---|---|
| 3,527,408 | 9/1970 | Markowski | 239/265.27 |
| 3,759,463 | 9/1973 | Roudil | 244/110 B |
| 3,837,411 | 9/1974 | Nash et al. | 244/110 B |
| 3,931,944 | 1/1976 | Capewell et al. | 244/110 B |
| 4,183,478 | 1/1980 | Rudolph | 244/110 B |
| 4,353,516 | 10/1982 | Soligny et al. | 244/110 B |
| 4,422,605 | 12/1983 | Fage | 244/110 B |

FOREIGN PATENT DOCUMENTS

| | | | |
|---|---|---|---|
| 652728 | 11/1962 | Canada | 239/265.29 |
| 745649 | 2/1956 | United Kingdom | 239/265.29 |
| 916968 | 1/1963 | United Kingdom | 239/265.29 |
| 1002709 | 8/1965 | United Kingdom | 244/110 B |

Primary Examiner—Galen Barefoot
Attorney, Agent, or Firm—Richard G. Geib; Daniel J. Tick; Bernard S. Hoffman

[57] ABSTRACT

A convergent-divergent jet exhaust nozzle has an aft end with an exit area thereat and a throat area spaced from the exit area and forward thereof. The ratio of the exit to throat diameter is from 1.00 to 1.05. Each of two symmetrical blocker doors has an axis coincident with the axis of the nozzle. Each of the blocker doors has opposite forward and rear edges and a surface extending between the edges. Each of the blocker doors is pivotally mounted to pivot about a pivot axis transverse to the axis of the nozzle and disposed downstream of the engine in the nozzle. The pivot axes are in a plane intersected by the axis of the nozzle. Each of the blocker doors has an inner surface and an outer surface and is movable between a first, stowed, position in which the inner surfaces thereof are contiguous with the inner surface of the nozzle and the forward and rear edges thereof are spaced from each other so that the nozzle is unobstructed and a second, fully deployed, position in which the rear edges are in closely adjacent relation and the inner surfaces form a continuous obstruction across the nozzle thereby blocking the nozzle flow and causing such flow to be diverted outward through cascade vanes which direct the flow in a partly forward direction to produce reverse thrust. A moving system is coupled to the blocker doors for selectively pivoting such doors about their axes in directions toward and away from each other. A latching device releasably latches the doors in the stowed position.

10 Claims, 6 Drawing Sheets

CASCADE THRUST REVERSER

This is a continuation of co-pending application Ser. No. 679,140, filed on Dec. 6, 1984, now abandoned.

BACKGROUND OF THE INVENTION

The present invention relates to a thrust reverser. More particularly, the invention relates to a cascade thrust reverser for braking a Jet aircraft by thrust reversal.

It is common practice in many commercial and military jet aircraft to brake the aircraft upon landing by effectively reversing the direction of thrust of the Jet engines. A common arrangement for providing such thrust reversal is to provide a pair of clam shell shaped blocker door members pivoted within the engine housing to swing from a position eclipsing openings in the engine housing to a position intercepting the thrust gases normally passing rearwardly of the engine thereby directing the gases out of the openings. Simultaneously with the swinging movement of the clam shell doors, partitions normally covering the housing openings swing outwardly and serve as a deflection or baffle wall for further guiding the outwardly deflected thrust gases forwardly thus providing the desired reverse thrust action.

The provision of the partition arrangements for cooperation with the clam shell structures in providing thrust reversal represents a substantial additional expense as well as an increase in weight of the overall aircraft. Furthermore, seals are required to prevent leakage between the blocker doors and the housing when such doors are in their stowed position. Moreover, there are many mechanical and hydraulic accessories necessary to operate such devices and as a consequence careful and periodic maintenance is required to assure reliability and safety.

A grid-like cascade vane structure has been fitted within the housing opening to replace the partition arrangement in known thrust reversers. The vanes in the grid structure are tilted forwardly slightly to provide the necessary forward component of gas flow necessary to realize a thrust reversal reaction. When the clam shell structures are in their normal inoperative position, they simply underlie the grid-like vane structure. Although this vane structure has advantages compared to the prior swinging partition type arrangements, it creates extra drag due to the positioning of the cascade vanes near the nacelle maximum cross-sectional area.

Thrust reversers are disclosed in U.S. Pat. Nos. 3,068,646; 3,931,944; 4,067,094; 4,129,269; 4,147,027 and 4,173,307.

Fletcher, in U.S. Pat. No. 3,068,646 discloses a thrust reverser arrangement which can be applied to a by-pass engine. The thrust reverser is connected to a by-pass air flow reverser. The by-pass passage is divided into two separate ducts along the sides of the engines and flaps interconnected with the engine thrust reverser are situated on the sides of the engine down-stream of the open ends of the by-pass duct portions and adapted when the engine thrust reverser is operative to move to position in which they cause the flow of by-pass air to be reversed.

Capewell et al, in U.S. Pat. No. 3,931,944, discloses a thrust reversal system for a jet aircraft engine, comprising thrust reverser buckets movable between a stowed and a deployed position. An air motor is operable under pilot's control to impart movement to the buckets. A piston is movable in a cylinder having restricted outlet orifices for automatically decelerating the motor when the buckets approach both the stowed and the deployed position. A locking mechanism locks the buckets in the stowed position and a flow control valve controls the direction of flow of operating air to the motor. The flow control valve, upon selection of deploy, initially occupies a position corresponding to movement of the motor in the direction to stow the buckets and, after release of the locking mechanism, moves to its alternative position to enable the motor to move the buckets to the deployed position.

Ittner, in U.S. Pat. Nos. 4,067,094 and 4,173,307, discloses a vane structure which fits within a side opening of an aircraft Jet engine normally covered by a pivoted clam shell arrangement. When the clam shell arrangement is actuated, it swings from the side opening in a direction to intercept thrust gases normally passing rearwardly of the engine and direct the gases laterally out of the side opening, the vane structure directing the gases upwardly and forwardly to provide a reverse thrust. The vane structure itself includes a number of beams lying in parallel vertical planes and a number of vanes in the form of continuous strips extending transversely to the direction of the beams, the beams having slots through which the vanes pass to define an egg crate like interlocked grid structure. The vanes are tilted forwardly slightly relative to the vertical to provide the forward component of gas movement creating the reverse thrust.

Fage, in the U.S. Pat. No. 4,129,269, discloses a thrust reverser for a Jet engine of an aircraft having two symmetrical doors mounted to pivot about an axis which is transverse and substantially diametrical with respect to the Jet of the engine and is disposed downstream of the jet exhaust pipe thereof The doors occupy a folded or stowed position in which they form part of the fairing of the engine or fuselage of the aircraft, or an unfolded or opened out position for which they are disposed transversely with respect to the jet.

Greathouse, one of the inventors of the present invention, in U.S. Pat. No. 4,147,027, discloses a thrust reverser nozzle for coaxial-flow turbofan engines comprising target-type deflector doors which are hinged for deployment about a fixed axis by means of actuation about single fixed pivots mounted on support structure on either side of the engine nacelle rearward portion. The deflector door's outer surfaces are shaped to match existing aerodynamic contours of the aircraft engine nacelle to provide a lower boattail angle for improved drag characteristics in the stowed or normal flight position. In that position, the deflector door interior configuration comprises a portion upstream of the engine exhaust nozzle exit plane and a downstream "fishmouth" portion through which flows hot engine exhaust gases surrounded circumferentially by cool air discharged from the engine fan. Geometry of the stowed fishmouth is sized and shaped to take advantage of mixing and shearing action between the exhaust streams so as to produce a desired variable area nozzle effect on the engine operation and thereby improve its forward thrust performance. Geometry of the upstream portion of the inside surface of the doors is sized and shaped with end plates so that when the deflector doors move to the deployed position, the exhaust streams are diverted outward and forward to produce a desired level of reverse thrust.

The principal object of the invention is to provide a cascade thrust reverser of simple structure which is efficient, effective and reliable in operation.

An object of the invention is to provide a cascade thrust reverser in a nozzle shaped to provide greater engine thrust at takeoff and less fuel consumption at cruise than known stowed thrust reverser nozzles.

Another object of the invention is to provide a cascade thrust reverser having enhanced simplicity of structure by utilizing a single hydraulic actuator and simple three bar mechanism.

Still another abject of the invention is to provide a thrust reverser which eliminates air leakage at the juncture of the thrust reverser with the jet exhaust nozzle in which it is installed, without the need for seals.

Yet another abject of the invention is to provide a thrust reverser which, in the absence of hydraulic pressure in the actuator, moves its blocker doors to stow position.

Another abject of the invention is to provide a cascade thrust reverser having blocker doors which are interchangeable and therefore may be substituted for each other.

Still another object of the invention is to provide a thrust reverser having actuator attachment fittings which permit interchanging from side to side.

Yet another object of the invention is to provide a thrust reverser having exhaust directing exposed vanes located at the aft end of the nacelle housing the nozzle to reduce drag considerably relative to a mid-nacelle location due to the shortened surface downstream of the vanes.

BRIEF SUMMARY OF THE INVENTION

In accordance with the invention, a thrust reverser for an aircraft jet engine in a nacelle comprises a convergent-divergent jet exhaust nozzle having an axis, an aft end with an exit area thereat and a throat area spaced from the exit area and forward thereof. The exit and throat areas have diameters and the ratio of the exit to throat diameter is from 1.00 to 1.05. Two symmetrical blocker doors each have an axis substantially coincident with the axis of the nozzle. Each of the blocker doors has opposite forward and rear edges and a surface extending between the edges. Each of the blocker doors is pivotally mounted to pivot about a pivot axis transverse to the axis of the nozzle and disposed downstream of the engine in the nacelle. The pivot axes are in a plane intersected by the axis of the nozzle. Each of the blocker doors has an inner surface and an outer surface. The blocker doors are movable between a first, stowed, position in which the inner surfaces thereof are substantially contiguous with the inner surface of the nozzle and the forward and rear edges thereof are spaced from each other so that the nozzle is substantially unobstructed and a second, fully deployed, position in which the rear edges are in closely adjacent relation and the inner surfaces form a substantially continuous obstruction across the nozzle thereby blocking the nozzle. A moving device is coupled to the blocker doors for selectively pivoting the blocker doors about their axes in directions toward and away from each other. A cascade vane exhaust director is provided in the nacelle casing. Latches are provided for releasably latching the blocker doors in the stowed position.

Each of the blocker doors is substantially semicylindrical in configuration and has opposite substantially semicircular forward and rear edges and a substantially semicylindrical surface extending between the edges, a concave substantially cylindrical inner surface and a convex substantially cylindrical outer surface.

The moving device comprises a hydraulic system having a single hydraulic actuator coupled to both the blocker doors.

The exhaust director comprises an opening between the exit and throat areas formed through the casing of the nacelle and covered by the blocker doors when the blocker doors are in the stowed position thereby blocking the opening and uncovered when the blocker doors are in the fully deployed position thereby uncovering the opening for exhaust from the engine, and flow directors in the opening for directing engine exhaust through the casing of the nacelle at an upstream angle.

Each of the blocker doors tapers downward from a maximum lateral distance between the forward and rear edges at a radial distance from the pivot axis thereof along the intersection of a plane perpendicular to the pivot axis at the center thereof and a plane through said pivot axis to a juncture of the forward and rear edges at the pivot axis. The inner surfaces of each of the blocker doors are spaced from each other by the diameter of the blocker door substantially coincident with the pivot axis.

The hydraulic actuator has an axis and the hydraulic system includes an idler crank coupled to the hydraulic actuator. The idler crank extends substantially perpendicularly to the axis of the actuator and has spaced opposite first and second ends. A first push rod couples the first end of the crank to one of the blocker doors and a second push rod couples the second end of the crank to the other of the blocker doors.

The latches comprise primary latches in the hydraulic actuator and secondary latches for latching the blocker doors in the stowed position.

Joints having cooperating parts on the nozzle and on the blocker doors provide a small downstream facing step between the blocker doors and the nacelle and nozzle at the opening of the nacelle when the blocker doors are in the stowed position.

The flow directors of the exhaust directors comprise cascade vanes exposed to the freestream airflow over the nacelle of the engine.

The first push rod is coupled to the outer surface of the one of the blocker doors adjacent the forward edge thereof and the second push rod is coupled to the outer surface of the other of the blocker doors adjacent the forward edge thereof.

The first push rod is coupled to the inner surface of the one of the blocker doors adjacent the forward edge thereof and the second push rod is coupled to the inner surface of the other of the blocker doors adjacent the forward edge thereof.

The primary latches comprise spring fingers in the hydraulic actuator. The spring fingers release to permit the actuator to deploy the blocker doors when a predetermined magnitude of pressure is introduced in the hydraulic system.

The secondary latches comprise a pair of releasable coupling units each having a first coupling component affixed to a corresponding one of the blocker doors and a second coupling component positioned so that when the blocker doors reach the stowed position each of the first coupling components engages the corresponding one of the second coupling components and couples therewith. Solenoids coupled to the second coupling components uncouple the first and second coupling components.

The pivot axes of the blocker doors are so positioned relative to the center of pressure of the blocker doors that in the absence of hydraulic pressure in the hydraulic actuator, the blocker doors will move to the stowed position.

The hydraulic system includes a hydraulic selector valve. When the solenoid is actuated, it uncouples and releases the coupling units and signals the hydraulic selector valve to apply pressure to the hydraulic actuator to deploy the blocker doors when the pressure reaches a predetermined magnitude.

Each of the joints comprises a lip extending downstream from the nacelle into the opening and an extended part of the forward edge of each of the blocker doors abutting the lip when the blocker doors are in the stowed position, the rear edge of each of the blocker doors abutting the nozzle adjacent the aft edge of the opening.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
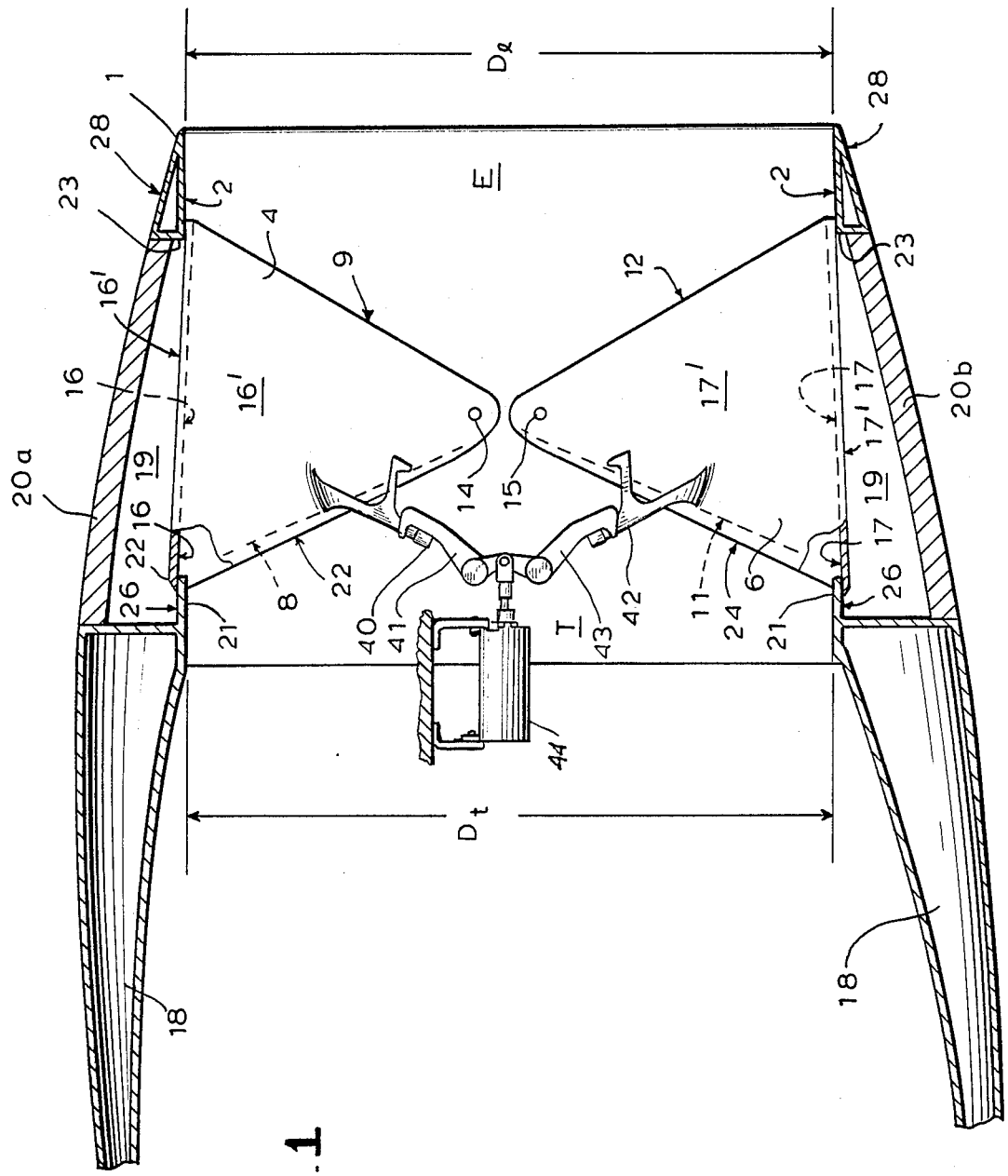
FIG. 1 is a schematic diagram, partly in section, of an embodiment of the cascade thrust reverser of the invention, with the blocker doors in stowed position, showing an embodiment of the latching system.
Figure 2:
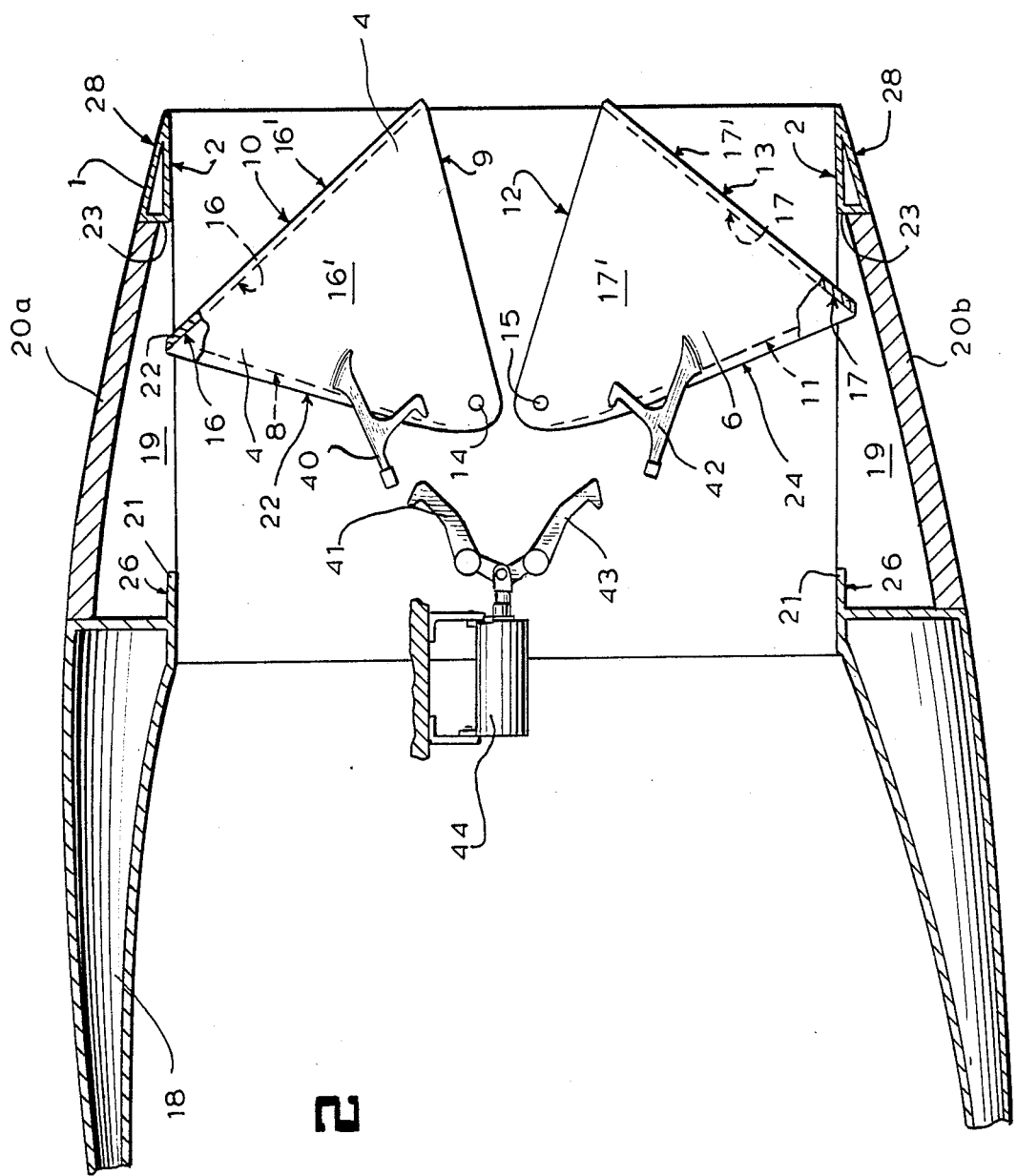
FIG. 2 is a schematic diagram, partly in section, of the embodiment of FIG. 1, with the blocker doors in partly deployed position.
Figure 3:
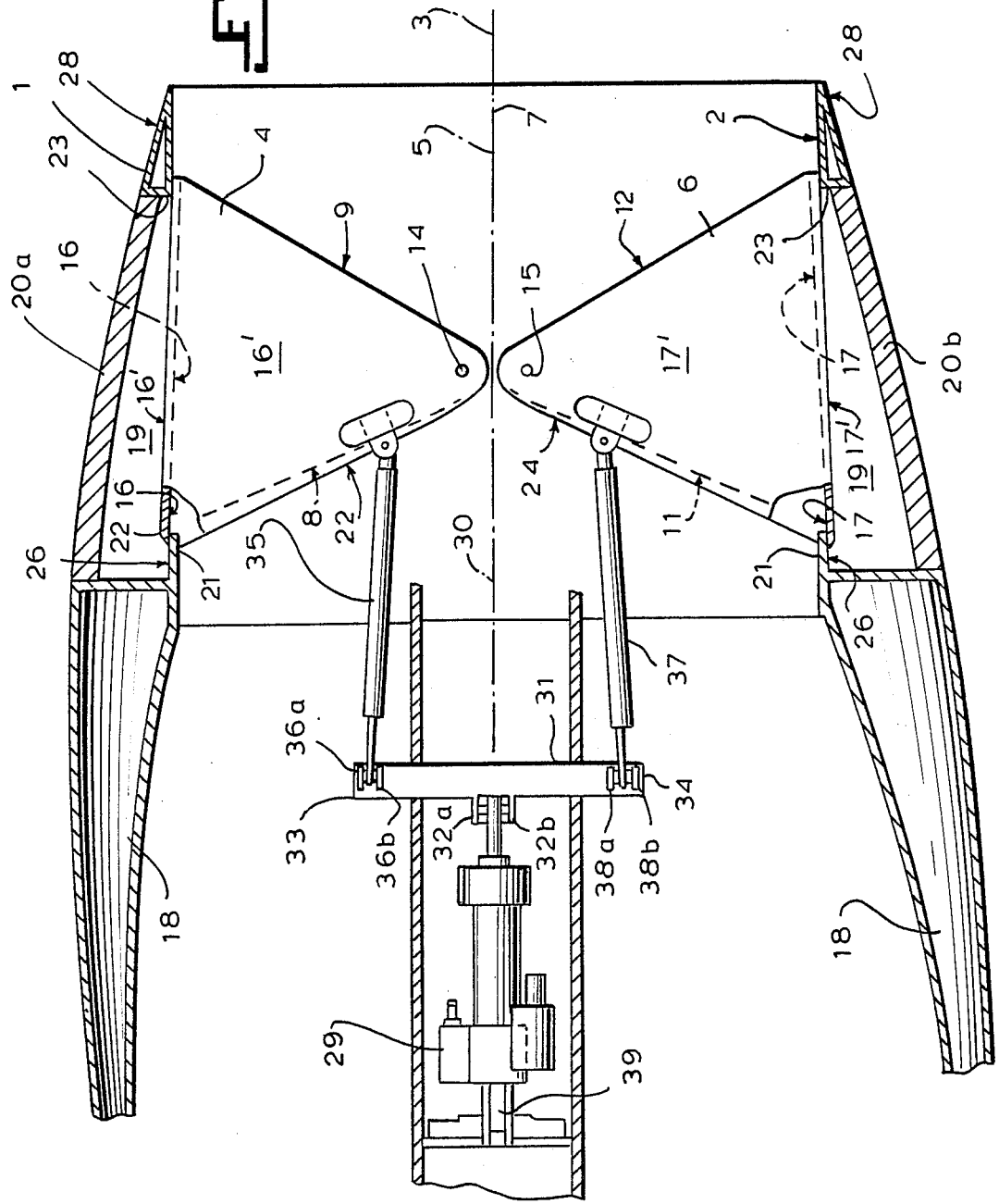
FIG. 3 is a schematic diagram, partly in section, of the embodiment of FIG. 1, with the blocker doors in stowed position, showing an embodiment of the hydraulic system.
Figure 4:
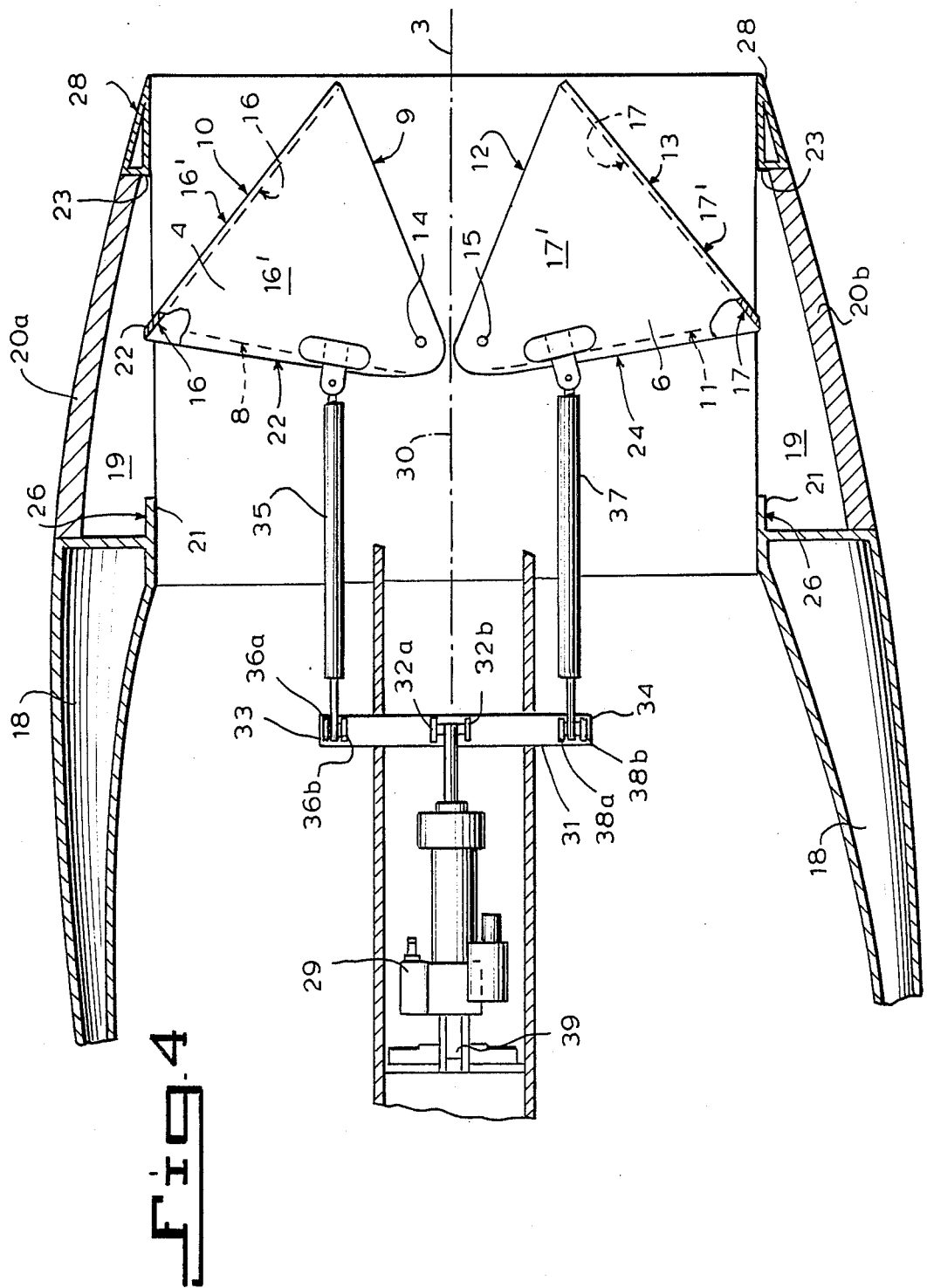
FIG. 4 is a schematic diagram, partly in section, of the embodiment of FIG. 3, with the blocker doors in a position intermediate the stowed position and the fully deployed position.
Figure 5:
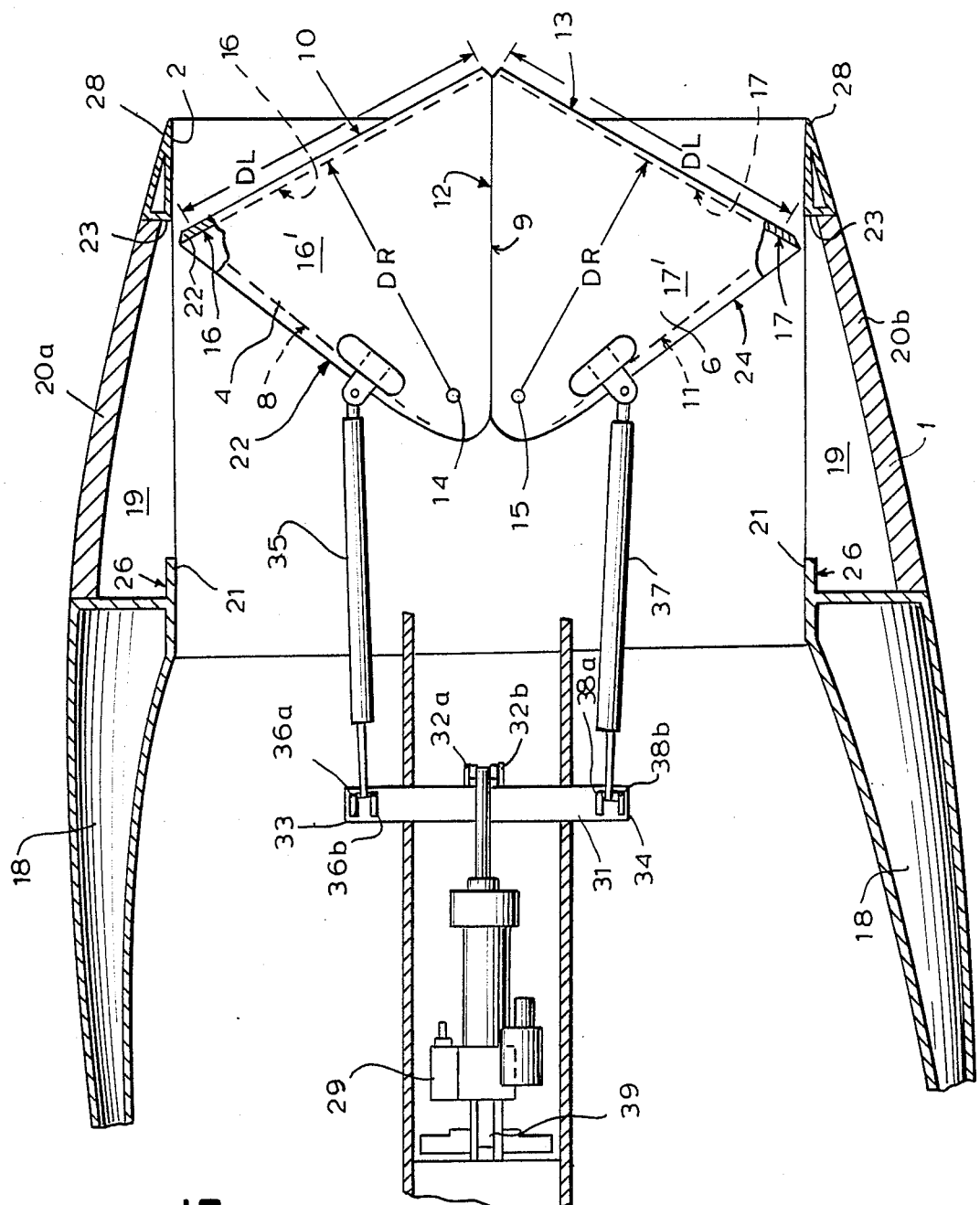
FIG. 5 is a schematic diagram, partly in section, of the embodiment of FIG. 3, with the blocker doors in fully deployed position.
Figure 6:
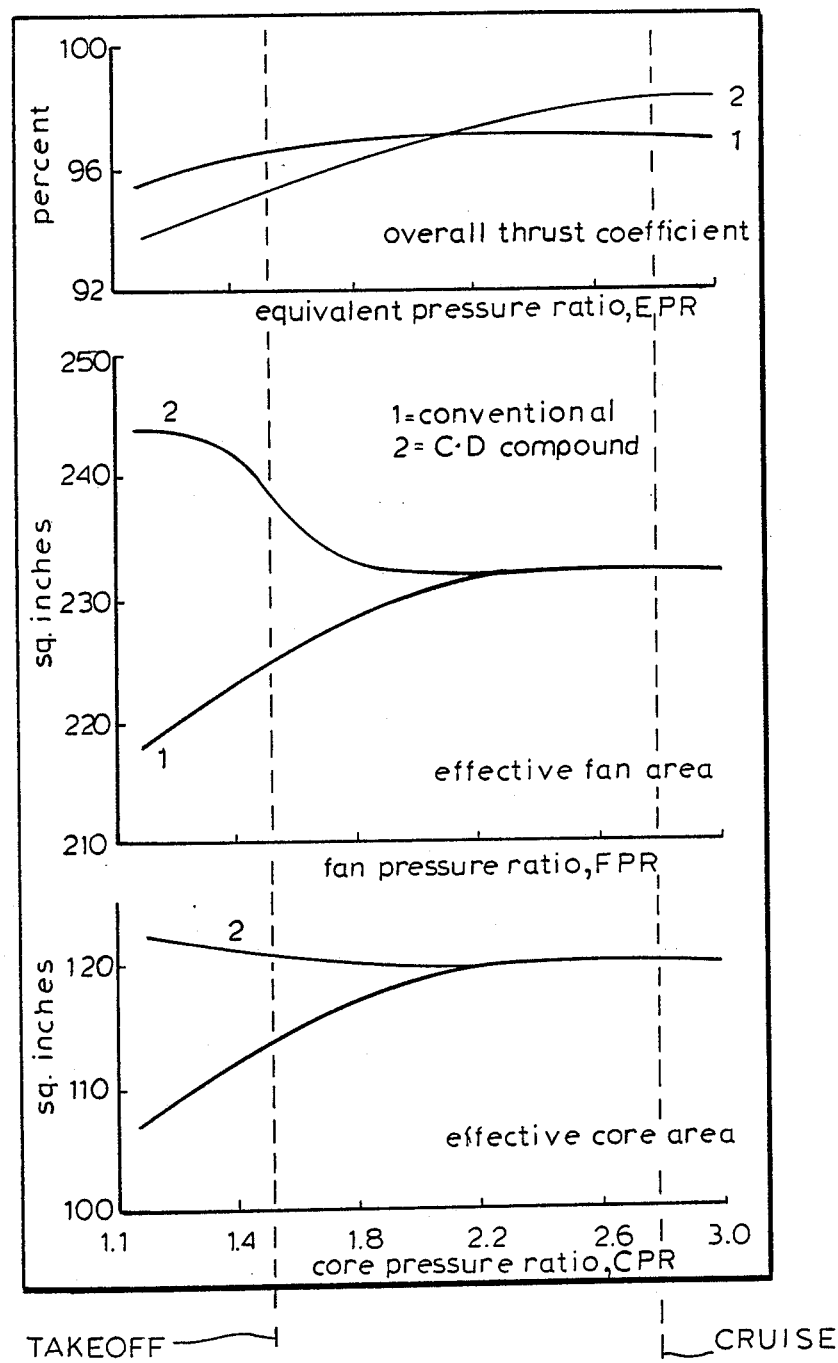
FIG. 6 is a series of graphic presentations illustrating performance of the convergent-divergent compound nozzle of the invention, relative to a conventional nozzle.

The thrust reverser of the invention is for an aircraft jet engine (not shown in the FIGS ) in a nacelle, said engine having a jet exhaust nozzle 1 with an inner surface 2, as shown in FIGS. 1 to 5, and an axis 3 (FIGS. 3 and 4). The jet exhaust nozzle 1 has an aft end with an exit area E thereat having a diameter $D_e$ (FIG. 1) and a throat area T spaced from said exit area and forward thereof, as shown in FIG. 1. The throat area T has a diameter $D_t$ (FIG. 1). In accordance with the invention, the ratio of the exit diameter $D_e$ to the throat diameter $D_t$ is from 1.00 to 1.05. This provides greater engine thrust at takeoff and less fuel consumption at cruise than known stowed thrust reverser nozzles because of the nozzle effective area characteristics, as shown in FIG. 6.

The thrust reverser of the invention comprises two symmetrical blocker doors each having an axis substantially adjacent and substantially parallel to the axis 3 of the nozzle 1. Thus, an upper blocker door 4 has an axis 5 (FIG. 3) coincident with the axis 3 of the nozzle 1 and a lower blocker door 6 has an axis 7 (FIG. 3) coincident with the axis 3 (FIG. 3).

Each of the doors 4 and 6 is substantially semicylindrical in configuration and has opposite substantially semicircular forward and rear edges and a substantially semicylindrical surface extending between said edges. Thus, the upper blocker door 4 is substantially semicylindrical in configuration and has opposite substantially semicircular forward and rear edges 8 and 9, respectively, (FIGS. 1 to 5) and a substantially semicylindrical surface 10 extending between said edges (FIGS. 2, 4 and 5). The lower blocker door 6 is substantially semicylindrical in configuration and has opposite substantially semicircular forward and rear edges 11 and 12, respectively, (FIGS. 1 to 5) and a substantially semicylindrical surface 13 extending between said edges (FIGS. 2, 4 and 5).

The upper blocker door is pivotally mounted to pivot about a pivot axis 14 (FIGS. 1 to 5) transverse to the nozzle 1 and disposed downstream of the engine (not shown in the FIGS.) in the nacelle. The lower blocker door 6 is pivotally mounted to pivot about a pivot axis 15 (FIGS. 1 to 5) transverse and substantially diametrical with respect to the nozzle 1 and disposed downstream of the engine (not shown in the FIGS.) in said nacelle. The pivot axes 14 and 15 are in a plane intersected by the axis 3 of the nozzle 1, transverse to the plane of the sheet of illustration of FIG. 3, and transverse to said axis of said nozzle.

Each of the blocker doors has a concave substantially cylindrical inner surface and a convex substantially cylindrical outer surface. Thus, the upper blocker door 4 has a concave substantially cylindrical inner surface 16 (FIGS. 1 to 5) and a convex substantially cylindrical outer surface 16' (FIGS. 1 to 5) and the lower blocker door 6 has a concave substantially cylindrical inner surface 17 (FIGS. 1 to 5) and a convex substantially cylindrical outer surface 17' (FIGS. 1 to 5).

The blocker doors 4 and 6 are movable between a first, stowed, position in which the inner surfaces 16 and 17, respectively, thereof are substantially contiguous with the inner surface 2 of the nozzle 1, as shown in FIGS. 1 and 3, and the forward and rear edges 8 and 9, respectively, of the upper blocker door 4 are spaced from the forward and rear edges 11 and 12 respectively, of the lower blocker door 6 (FIGS. 1 and 3) so that said nozzle is substantially unobstructed, as shown in FIGS. 1 and 3.

The blocker doors 4 and 6 are movable to a second, fully deployed, position in which the rear edges 9 and 12 of the upper and lower blocker doors 4 and 6, respectively, are in abutment, as shown in FIG. 5, and the inner surfaces of said blocker doors form a continuous obstruction across the nozzle 1 thereby substantially blocking said nozzle.

The blocker doors 4 and 6 are also movable to a plurality of intermediate positions, two of which are shown in FIGS. 2 and 4, in which the inner surfaces 16 and 17, respectively, and the outer surfaces 16' and 17', respectively, thereof are spaced from the inner surface 2 of the nozzle 1 and the forward and rear edges 8 and 9, respectively, of the upper blocker door 4 are spaced from the forward and rear edges 11 and 12, respectively, of the lower blocker door 6 so that said nozzle is partially obstructed or narrowed, as shown in FIGS. 2 and 4.

Each of the upper and lower blocker doors 4 and 6 tapers downward from a maximum lateral distance DL between its forward and rear edges at a radial distance DR from the pivot axis thereof along the intersection of a plane perpendicular to said pivot axis at the center thereof and a plane through said pivot axis to a juncture of said forward and rear edges at said pivot axis (FIG. 5). The inner surfaces of each of the blocker doors 4 and 6 are spaced from each other by the diameter of the door substantially coincident with the pivot axis, and the outer surfaces of each of said blocker doors are spaced from each other by the diameter of the door substantially coincident with the pivot axis plus the thickness of such door.

Thus, the upper blocker door 4 tapers downward from a maximum lateral distance DL between its forward and rear edges 8 and 9 at a radial distance DR from the pivot axis 14 thereof along the intersection of a plane perpendicular to said pivot axis at the center thereof and a plane through said pivot axis to a juncture of said forward and rear edges at said pivot axis, as shown in FIG. 5. The lower blocker door 6 tapers downward from a maximum lateral distance DL between its forward and rear edges 11 and 12 at a radial distance DR from the pivot axis 15 thereof along the intersection of a plane perpendicular to said pivot axis at the center thereof and a plane through said pivot axis to a juncture of said forward and rear edges at said pivot axis, as shown in FIG. 5.

The nacelle has a casing 18 and a cascade vane exhaust directing device in said nozzle. The exhaust directing device comprises an opening 19 between the exit and throat areas E and T, respectively, formed through the casing 18 of the nacelle, as shown in FIGS. 1 to 5. The opening 19 is covered by the blocker doors 4 and 6 (FIGS. 1 and 3) when said blocker doors are in the stowed position, thereby blocking said opening. The opening 19 is uncovered when the blocker doors 4 and 6 are in the fully deployed position, as shown in FIG. 5, thereby uncovering said opening for exhaust from the engine. A flow director such as, for example, a plurality of spaced parallel cascade vanes 20a and 20b (FIGS. 1 to 5), is provided in the opening 19 for directing engine exhaust through the casing 18 of the nacelle at an upstream angle. The vanes 20a and 20b are exposed to the freestream airflow over the nacelle of the engine.

A joint, shown in FIGS. 1 to 5, has cooperating parts on the nozzle 1 and on the upper and lower blocker doors 4 and 6, respectively, and provides a small downstream facing step between said blocker doors and said nozzle at the opening 19 when said blocker doors are in the stowed position (FIGS. 1 and 3). As shown in FIGS. 1 to 5, the joint comprises a lip 21 extending downstream from the casing 18 of the nacelle into the opening 19 and an extended part of the forward edge of each of the blocker doors 4 and 6 abutting or overlapping said lip when said blocker doors are in the stowed position, shown in FIGS. 1 and 3. The rear edge 9 and 12, respectively, of each of the blocker doors 4 and 6, respectively, abuts the nozzle 1 adjacent the aft edge of the opening 19.

Thus, as shown in FIGS. 1 and 3, when the doors 4 and 6 are in the stowed position, an extended part 22 of the forward edge 8 of the upper blocker door 4 abuts or overlaps the lip 21 and the rear edge 9 of said upper blocker door abuts or underlaps the nozzle 1 adjacent the aft edge 23 of the opening 19. At such time, an extended part 24 of the forward edge 11 of the lower blocker door 6 abuts or overlaps the lip 21 and the rear edge 12 of said lower blocker door abuts or underlaps the nozzle 1 adjacent the aft edge 23 of the opening 19. More particularly, when the blocker doors are in the stowed position, the inner surface 16 of the upper blocker door 4 at the extended part 22 of the forward edge 8 of said blocker door abuts the outer surface 26 of the lip 21 and the outer surface 16' of said blocker door close adjacent the rear edge 9 of said blocker door abuts the inner surface 2 of the nozzle 1 adjacent the aft edge 23 of the opening 19. At such time, the inner surface 17 of the lower blocker door 6 at the extended part 24 of the forward edge 11 of said blocker door abuts the outer surface 26 of the lip 21 and the outer surface 17' of said blocker door close adjacent the rear edge 12 of said blocker door abuts the inner surface 2 of the nozzle 1 adjacent the aft edge 23 of the opening 19.

The joint device of the invention eliminates air leakage at the juncture of the thrust reverser with the nacelle and nozzle, without the need for seals. The positioning of the opening 19 close to the exit area E shortens the surface 28 for low pressure at the aft end of the nacelle housing the nozzle 1 (FIGS. 1 to 5) and results in a considerable reduction of drag.

A moving device of any suitable known type, which is preferably a hydraulic system, is coupled to the blocker doors 4 and 6 (FIGS. 3 to 5) for selectively pivoting said doors about their axes 14 and 15, respectively, in directions toward and away from each other. The hydraulic system has a single hydraulic actuator 29 coupled to both doors 4 and 6 (FIGS. 3, 4 and 5). The hydraulic actuator 29 has an axis 30 (FIGS. 3 and 4) and the hydraulic system includes an idler crank 31 coupled to said hydraulic actuator via suitable lugs 32a, 32b (FIGS. 3 to 5). The axes 3 and 30 are coincident, but need not be. The idler crank 31 extends substantially perpendicularly to the axis 30 of the actuator 29 and has spaced opposite first and second ends 33 and 34, respectively.

A first, or upper, push rod 35 couples the first end 33 of the idler crank 31 to the upper blocker door 4 via suitable lugs 36a, 36b (FIGS. 3 to 5) and a second, or lower, push rod 37 couples the second end 34 of said idler crank to the lower blocker door 6 via suitable lugs 38a, 38b (FIGS. 3 to 5). The first push rod 35 is preferably coupled to the outer surface 16' of the upper blocker door 4 adjacent the forward edge 8 thereof, as shown in FIGS. 3 to 5. In such case, the second push rod 37 is preferably coupled to the outer surface 17' of the lower blocker door 6 adjacent the forward edge 11 thereof, as shown in FIGS. 3 to 5. Alternatively, the first push rod 35 may be coupled to the inner surface 16 of the upper blocker door 4 adjacent the forward edge 8 thereof and the second push rod 37 may then be coupled to the inner surface 17 of the lower blocker door 6 adjacent the forward edge 11 thereof.

The thrust reverser of the invention is provided with a latching system for releasably latching the blocker doors 4 and 6 in their stowed position. The latching system comprises a primary latch system in the hydraulic actuator 29 (FIGS. 3 to 5) and a secondary latch system (FIGS. 1 and 2) for latching the blocker doors 4 and 6 in the stowed position, as shown in FIGS. 1 and 3.

The primary latch system of the hydraulic actuator 29 comprises internal spring fingers in said actuator (not shown in the FIGS.) which release or separate to permit said actuator to deploy the blocker doors 4 and 6 when a predetermined magnitude of pressure is introduced in the hydraulic system. The hydraulic system includes a hydraulic selector valve 39 (FIGS. 3 to 5).

The secondary latch system comprises a pair of releasable coupling units, as shown in FIGS. 1 and 2. Each of the coupling units has a first coupling component affixed to a corresponding one of the blocker doors 4 and 6 and a second coupling component positioned so that when the blocker doors reach the stowed position each of the first coupling components engages the corresponding one of the second coupling components and couples therewith. Thus, the first releasable coupling unit has a first coupling component, or adjustable stop, 40 affixed to the upper blocker door 4 and a second coupling component, or secondary latch or stow lock, 41 positioned so that when the blocker doors 4 and 6 reach the stowed position said first coupling component engages said second coupling component and couples therewith, as shown in FIG. 1. When the blocker doors 4 and 6 are in any other, non-stowed, position, as shown in FIG. 2, the first and second coupling components 40 and 41 are separated or spaced from each other.

The second releasable coupling unit has a first coupling component, or adjustable stop, 42 affixed to the lower blocker door 6 and a second coupling component, or secondary latch or stow lock, 43 positioned so that when the blocker doors 4 and 6 reach the stowed position said first coupling component engages said second coupling component and couples therewith, as shown in FIG. 1. When the blocker doors 4 and 6 are in any other, non-stowed, position, as shown in FIG. 2, the first and second coupling components 42 and 43 are separated or spaced from each other.

A secondary latch solenoid 44 is coupled to the second coupling components 41 and 43 (FIGS. 1 and 2) and uncouple the first and second coupling components 40 and 41 and the first and second coupling components 42 and 43, respectively. When the solenoid 44 is actuated or energized, it uncouples and releases the coupling units and signals the hydraulic selector valve 39 to apply pressure to the hydraulic actuator 29. This is accomplished by any suitable known control arrangement under the control of the pilot of the aircraft such as, for example, a manually operated switch connected in an energizing circuit for the solenoid 44. Then, when the pressure reaches the predetermined magnitude, the internal spring fingers release, or separate, and the actuator 29 extends and deploys the blocker doors 4 and 6.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

We claim:

1. A thrust reverser for an aircraft jet engine in a nacelle having a casing, said thrust reverser comprising
   a convergent-divergent jet exhaust nozzle having an axis, an aft end with an exit area thereat, an inner surface and a throat area spaced from said exit area and forward thereof, said exit and throat areas having diameters and the ration of the exit to throat diameter being from 1.00 to 1.05;
   two symmetrical blocker doors each having an axis substantially coincident with the axis of said nozzle, each of said blocker doors having opposite forward and rear edges and a surface extending between said edges and each being pivotally mounted to pivot about a pivot axis transverse to the axis of said nozzle and disposed downstream of said engine in said nacelle, said pivot axes being in a plane intersected by the axis of said nozzle, each of said blocker doors having an inner surface and an outer surface and being movable between a first, stowed, position in which the inner surfaces thereof are substantially contiguous with the inner surface of said nozzle and said forward and rear edges thereof are spaced from each other so that said nozzle is substantially unobstructed and a second, fully deployed, position in which said rear edges are in closely adjacent relation and said inner surfaces form a substantially continuous obstruction across said nozzle thereby blocking said nozzle, the forward edge of each of said blocker doors having an extended part;
   moving means coupled to said blocker doors for selectively pivoting said blocker doors about their axes in directions toward and away from each other;
   cascade vane exhaust directing means in said nacelle casing;
   latching means for releasably latching said blocker doors in said stowed position; and
   joint means having cooperating parts on said nozzle and on said blocker doors for providing a small downstream facing step between said blocker doors and said nacelle and nozzle at said opening of said nacelle when said blocker doors are in said stowed position, said joint means comprising a stationary lip extending downstream from said nacelle into said opening, the inner surface of the extended part of said forward edge of each of said blocker doors abutting and overlapping said lip when said blocker doors are in said stowed position, the outer surface of the rear edge of each of said blocker doors abutting and underlapping said nozzle adjacent the aft edge of said opening.

2. A thrust reverser as claimed in claim 1, wherein each of said blocker doors is substantially semicylindrical in configuration and has opposite substantially semicurcular forward and rear edges and a substantially semicylindrical surface extending between said edges, a concave substantially cylindrical inner surface and a convex substantially cylindrical outer surface, each of said blocker doors tapering downward from a maximum lateral distance between said forward and rear edges at a radial distance from the pivot axis thereof along the intersection of a plane perpendicular to said pivot axis at the center thereof and a plane through said pivot axis to a juncture of said forward and rear edges at said pivot axis, said inner surfaces of each of said blocker doors being spaced from each other by the diameter of said blocker door substantially coincident with said pivot axis.

3. A thrust reverser as claimed in claim 1, wherein said moving means comprises a hydraulic system having a single hydraulic actuator coupled to both said blocker doors, said hydraulic actuator having an axis and said hydraulic system including an idler crank coupled to said hydraulic actuator, said idler crank extending substantially perpendicularly to the axis of said actuator and having spaced opposite first and second ends, a first push rod coupling the first end of said crank to one of said blocker doors and a second push rod coupling the second end of said crank to the other of said blocker doors.

4. A thrust reverser as claimed in claim 1, wherein said opening between said exit and throat areas formed through said casing of said nacelle is covered by said blocker doors when said blocker doors are in said stowed position thereby blocking said opening and uncovered when said blocker doors are in said fully deployed position thereby uncovering said opening for exhaust from said engine, and flow directing means in said opening for directing engine exhaust through said casing of said nacelle at an upstream angle, said flow directing means comprising cascade vanes exposed to the freestream airflow over the nacelle of the engine.

5. A thrust reverser as claimed in claim 1, wherein said exhaust directing means includes an opening between said exit and throat areas formed through said casing of said nacelle and wherein said lip has an outer surface whereby when said blocker doors are in the stowed position, the inner surface of each of said blocker doors at the extended part of the forward edge thereof abuts the outer surface of said lip and the outer surface of each of said blocker doors close adjacent the rear edge thereof abuts the inner surface of said nozzle adjacent the aft edge of said opening.

6. A thrust reverser as claimed in claim 3, wherein said first push rod is coupled to the outer surface of said one of said blocker doors adjacent said forward edge thereof and said second push rod is coupled to the outer surface of said other of said blocker doors adjacent said forward edge thereof.

7. A thrust reverser as claimed in claim 3, wherein said first push rod is coupled to the inner surface of said one of said blocker doors adjacent said forward edge thereof and said second push rod is coupled to the inner surface of said other of said blocker doors adjacent said forward edge thereof.

8. A thrust reverser as claimed in claim 3, wherein said latching means comprises primary latch means in said hydraulic actuator and secondary latch means for latching said blocker doors in said stowed position, and said secondary latch means comprises a pair of releasable coupling units each having a first coupling component affixed to a corresponding one of said blocker doors and a second coupling component positioned so that when said blocker doors reach said stowed position each of said first coupling components engages the corresponding one of said second coupling components and couples therewith, and solenoid means coupled to said second coupling components for uncoupling said first and second coupling components.

9. A thrust reverser as claimed in claim 3, wherein said pivot axes of said blocker doors are so positioned relative to the center of pressure of said blocker doors that in the absence of hydraulic pressure in said hydraulic actuator, said blocker doors will move to said stowed position.

10. A thrust reverser as claimed in claim 3, wherein said hydraulic system includes a hydraulic selector valve, and wherein when said solenoid is actuated it uncouples and releases said coupling units and signals said hydraulic selector valve to apply pressure to said hydraulic actuator to deploy said blocker doors when the pressure reaches a predetermined magnitude.

* * * * *

UNITED STATES PATENT AND TRADEMARK OFFICE
CERTIFICATE OF CORRECTION

PATENT NO. : 4,790,495
DATED : December 13, 1988
INVENTOR(S) : William K. Greathouse and Sherman F. Martin It is certified that error appears in the above-identified patent and that said Letters Patent is hereby corrected as shown below:

Col. 2, lines 17, 35 and 38, "Jet" should be -- jet --
      line 39, "thereof" should be -- thereof.--
Col. 3, lines 14, 18 and 22, "abject" should be -- object --
Col. 5, line 28, "wherein" should be -- wherein: --
Col. 9, line 40, "and" should be -- and functions to --
Col. 10, line 3, which is claim 1, "ration" should be -- ratio --
      line 52, which is claim 2, "curcular" should be -- circular --

Signed and Sealed this

Thirty-first Day of July, 1990

*Attest:*

HARRY F. MANBECK, JR.

*Attesting Officer*      *Commissioner of Patents and Trademarks*